United States Patent Office 2,954,371
Patented Sept. 27, 1960

2,954,371
WATER INSOLUBLE DISAZO-DYESTUFFS

Hans Wilhelm Liechti, Oberwil, Basel-Land, Switzerland, assignor to Ciba Limited, Basel, Switzerland, a firm of Switzerland No Drawing. Filed Jan. 2, 1959, Ser. No. 784,461

Claims priority, application Switzerland Feb. 12, 1958

7 Claims. (Cl. 260—186)

The present invention provides new disazo-dyestuffs which are free from groups imparting solubility in water and correspond to the general formula (1)       A—N=N—B—N=N—C—OH in which A represents a benzene radical which has a nitro group in ortho-position or preferably in meta-position to the azo linkage, B represents a benzene radical and C represents a benzene radical containing a hydroxyl group in para-position to the azo linkage.

The new disazo-dyestuffs of this invention are obtained by coupling a hydroxy-benzene capable of coupling in the para-position with the diazo-compound of an amino-azodyestuff of the general formula (2)       A—N=N—B—NH$_2$ in which A and B have the meanings given above.

Especially suitable as diazo-compounds are amino-azodyestuffs of the above formula, in which the benzene radicals A and B if they contain further substituents, contain only halogen atoms or alkyl or alkoxy groups.

Amino-azo-dyestuffs of the above Formula 2 may be prepared by coupling a diazo-compound of an ortho- or meta-nitraniline, for example, 1-amino-2-nitrobenzene, 1-amino-3-nitrobenzene, 1-amino-2-nitro-4-methylbenzene or 1-amino-2-nitro-methoxybenzene with an aminobenzene which is free from groups imparting solubility in water as the middle component and which is capable of coupling in para position relatively to the amino group, for example, aniline, 2-chloraniline, 2- or 3-methoxy-aniline, 2- or 3-ethoxy-aniline, 2:5-dimethoxy-aniline, 2:5-diethoxy aniline, 2- or 3-methyl-aniline, 2:5-dimethyl-aniline, 2-methoxy-5-methyl-aniline or 2-chloro-5-methoxy-aniline. The coupling is advantageously carried out in a medium ranging from weakly acid to weakly alkaline, for example, a medium rendered acid with acetic acid or alkaline with an alkali metal bicarbonate. If the middle component has a low coupling power, it is usually preferable to couple it in the form of its ω-methane-sulfonic acid, the ω-methane sulfonic acid group is subsequently split off. This is the case, for example, with 1-amino-2-methoxy-benzene. The diazotization of the amino-azo-dyestuffs of the above formula can be carried out in known manner, for example, by means of hydrochloric acid and sodium nitrite. In the process of this invention, the diazo-amino-compound so obtained is coupled with the end component in an alkaline medium, for example, one rendered alkaline with an alkali metal carbonate, and advantageously in the presence of an added coupling assistant such, for example, as pyridine or a picoline.

Suitable as end components are those hydroxybenzenes which are capable of coupling in para-position relatively to their hydroxyl group, such, for example, as phenol, 1-hydroxy-2-methyl-benzene, 1-hydroxy-3-methyl-benzene, 1-hydroxy-3-methoxy-benzene, 1-hydroxy-2-chloro-benzene, 2:5-dimethyl-phenol or 3:5-dimethyl-phenol. Instead of a single hydroxy-benzene, a mixture of two or more hydroxy-benzenes, for example, a mixture of two isomeric hydroxy-benzenes can be used.

The new disazo-dyestuffs, especially after they have had an appropriate pasting treatment which may be combined with reprecipitation, for example, from sulfuric acid, are very suitable for dyeing or printing shaped structures, especially polyester fibrous materials such, for example, as those of polyethylene terephthalates, which are known under the registered trademarks of "Terylene" and "Dacron." By dyeing by the usual methods, for example, in a dyebath containing a dispersion of the dyestuff and advantageously also containing a dispersing agent, and at a temperature close to 100° C., and if desired with the addition of a swelling agent, or at a temperature above 100° C. under superatmospheric pressure there are obtained pure and generally full orange to scarlet dyeings of very good fastness to light and sublimation. The new dyestuffs may also be used for dyeing or printing shaped structures of esters or ethers of cellulose, super-polyamides or super-polyurethanes or of polyvinyl chloride. They may also be used as pigments.

The following examples illustrate the invention, the parts and percentages being by weight:

Example 1

28.6 parts of 4-amino-2-methyl-5-methoxy-3'-nitro-1:1'-azobenzene were diazotized in known manner and the solution of the diazo compound was filtered through active carbon. The filtrate was coupled at a temperature within the range of 5° C.–10° C. with a solution of 9.4 parts of hydroxybenzene in 100 parts of water, 10 parts of a 30% solution of sodium hydroxide, 20 parts of sodium carbonate and 20 parts of sodium acetate. Coupling took place immediately. The product was filtered off, washed neutral with water and dried.

The water-insoluble dyestuff was obtained as a brown powder, which was used in a fine dispersion to dye rayon and polyamide fibers, such as nylon and perlon, and gave an orange tint of excellent fastness. Above all, the new dyestuff, dyed polyester fibers, such as Dacron, Terylene or Diolen (regd. trademarks) full orange tints of outstanding fastness to sublimation.

A dyestuff having similar properties as that obtained above, was obtained when 4-amino-2-methyl-5-methoxy-2'-nitro-1:1'-azobenzene was used as starting material instead of 4-amino-2-methyl-5-methoxy-3'-nitro-1:1'-azobenzene.

When 4-amino-2:5-dimethyl-3'-nitro-1:1' - azobenzene was used as starting material instead of either of those mentioned above, a dispersion dyestuff was obtained which dyed the above mentioned materials yellowish orange tints having the same good properties as had the other dyestuffs.

Example 2

28.6 parts of 4-amino-2-methyl-5-methoxy-3'-nitro-1:1'-azobenzene were diazotized in known manner and the solution of the diazo compound was filtered through active carbon. The filtrate, at a temperature within the range of 5° C–10° C. was added to a solution of 10.8 parts of 1-methyl-2-hydroxy-benzene in 100 parts of water, 10 parts of a 30% solution of soduim hydroxide, 20 parts of sodium carbonate and 10 parts of sodium acetate. The product was filtered off, washed neutral with water and dried.

The water-insoluble dyestuff was obtained as a brown powder which was used in a fine dispersion to color rayon and polyamide fibers, such as nylon and perlon, and gave an orange tint of excellent fastness. Above all, the new dyestuff colored polyester fibers such as Dacron, Terylene, or Diolen (registered trademarks) full orange tints of outstanding fastness to sublimation. When 1-methyl-3-hydroxybenzene was used as azo-component instead of 1-methyl-2-hydroxybenzene, similar good properties were shown by the dyeings on the above mentioned materials.

*Example 3*

1 part of the dyestuff obtained in Example 1 was milled wet with 2 parts of a 50% aqueous solution of cellulose sulfite lye and then dried.

The dyestuff preparation thus obtained was stirred with 40 parts of a 10% aqueous solution of a condensation product of octodecyl alcohol and 20 molecular proportions of ethylene oxide, and to this were added 4 parts of a 40% acetic acid solution. After diluting with water 4000 parts of a dyebath were obtained.

100 parts of a cleaned polyester fiber material was placed into the above bath at 50° C., the bath was then heated in half an hour to a temperature within the range of 120° C. to 130° C. and dyeing was carried out for 1 hour in the closed vessel at that temperature. The material was then well rinsed. The resulting dyeing was full bright orange of very good fastness to light and sublimation.

When the above-mentioned dye bath contained 8 parts of soap instead of the 4 parts of 40% acetic acid solution, a dyeing was obtained which has similar properties of strength, coloration and fastness.

*Example 4*

100 parts of a cleaned polyester fibrous material were treated for 15 minutes in a dyebath at 50° C. containing, per 4000 parts, 12 parts of diammonium phosphate with 400 parts of a 10% aqueous solution of a condensation product from octadecyl alcohol and 20 molecular proportions of ethylene oxide.

To the above bath was added 1 part of a fine dispersion of the dyestuff obtained in Example 1 in 2 parts of a 50% aqueous solution of cellulose sulfite lye, and the bath temperature was then raised in half an hour to the boil. Dyeing was carried out for 1½ hours to 2 hours at the boil.

The dyed material was then placed in a bath containing 2 parts of a 30% sodium hydroxide solution and 10 parts of a 10% aqueous solution of a condensation product from octadecyl alcohol and 20 molecular proportions of ethylene oxide, per 1000 parts of water, and treated therein for 30 minutes at 70° C. and then rinsed. A full bright orange dyeing was obtained of good fastness to light and very good fastness to sublimation, and which corresponded exactly in strength and tint to that obtained in Example 3.

What is claimed is:

1. A disazo-dyestuff which corresponds to the formula $$A-N=N-B-N=N-C-OH$$

in which A represents a benzene radical which has a nitro group which is at most 3 nuclear carbon atoms removed from the azo-group, B represents a benzene radical and C represents a benzene radical containing the hydroxy group in para-position to the azo-linkage, said dyestuff containing as further substituents at most only members selected from the group consisting of chlorine atoms, lower alkyl and lower alkoxy groups.

2. A disazo-dyestuff as claimed in claim 1 in which the nitro group is in meta-position to the azo-group.

3. The disazo-dyestuff of the formula

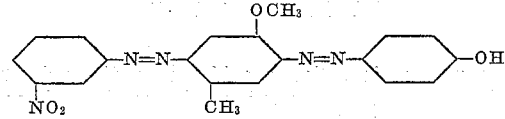

4. The disazo-dyestuff of the formula

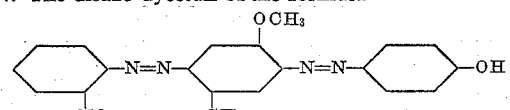

5. The disazo-dyestuff of the formula

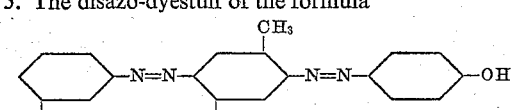

6. The disazo-dyestuff of the formula

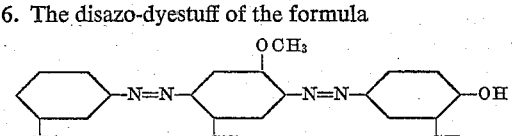

7. The disazo-dyestuff of the formula

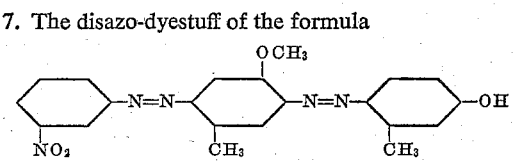

References Cited in the file of this patent
UNITED STATES PATENTS

| | | |
|---|---|---|
| 1,901,278 | Baddiley et al. | Mar. 14, 1933 |
| 2,286,317 | Stanley et al. | June 16, 1942 |
| 2,782,185 | Merian | Feb. 19, 1957 |